(12) United States Patent (10) Patent No.: US 9,564,150 B1
Gider et al. (45) Date of Patent: Feb. 7, 2017

(54) MAGNETIC READ APPARATUS HAVING AN IMPROVED READ SENSOR ISOLATION CIRCUIT

(71) Applicant: Western Digital (Fremont), LLC, Fremont, CA (US)

(72) Inventors: Savas Gider, San Jose, CA (US); Neil D. Knutson, Fremont, CA (US); Steven C. Rudy, Carmel Valley, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/951,411

(22) Filed: Nov. 24, 2015

(51) Int. Cl.
*G11B 5/02* (2006.01)
*G11B 5/60* (2006.01)

(52) U.S. Cl.
CPC .............. *G11B 5/02* (2013.01); *G11B 5/6005* (2013.01)

(58) Field of Classification Search
None
See application file for complete search history.

(56) References Cited

U.S. PATENT DOCUMENTS

| | | | |
|---|---|---|---|
| 5,014,146 A * | 5/1991 | Takatsuka | G11B 5/4833 360/266 |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,060 A * | 10/2000 | Ryat | G01R 33/09 360/46 |
| 6,134,089 A | 10/2000 | Barr et al. | |
| 6,136,166 A | 10/2000 | Shen et al. | |
| 6,137,661 A | 10/2000 | Shi et al. | |
| 6,137,662 A | 10/2000 | Huai et al. | |
| 6,160,684 A | 12/2000 | Heist et al. | |
| 6,163,426 A | 12/2000 | Nepela et al. | |
| 6,166,891 A | 12/2000 | Lederman et al. | |
| 6,173,486 B1 | 1/2001 | Hsiao et al. | |

(Continued)

*Primary Examiner* — Peter Vincent Agustin
(74) *Attorney, Agent, or Firm* — Convergent Law Group LLP

(57) ABSTRACT

A method and system provide a magnetic read apparatus. The magnetic read apparatus includes a substrate and an isolation circuit. The isolation circuit includes a bias resistor and a capacitor residing on the substrate. The bias resistor and the capacitor are connected in parallel through the substrate.

18 Claims, 4 Drawing Sheets

(56) References Cited

U.S. PATENT DOCUMENTS

| | | |
|---|---|---|
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B1 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |

(56) References Cited

U.S. PATENT DOCUMENTS

| | | |
|---|---|---|
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,016,139 B2 | 3/2006 | Baumgart et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,960 B1 | 4/2007 | Schreck et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |

(56) References Cited

U.S. PATENT DOCUMENTS

| | | |
|---|---|---|
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,049,984 B2 | 11/2011 | Contreras et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,309 B2 | 3/2012 | Knigge et al. |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |

(56) References Cited

U.S. PATENT DOCUMENTS

| | | |
|---|---|---|
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,506 B2 | 12/2013 | Contreras et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,891,189 B1* | 11/2014 | Contreras ............... G11B 5/02 360/46 |
| 2007/0076322 A1* | 4/2007 | Choi ................... G11B 5/4826 360/234.4 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2015/0103430 A1* | 4/2015 | Gadbois ............... G11B 5/4853 360/59 |
| 2015/0103437 A1* | 4/2015 | Watanabe ................ G11B 5/02 360/111 |

* cited by examiner

MAGNETIC READ APPARATUS HAVING AN IMPROVED READ SENSOR ISOLATION CIRCUIT

BACKGROUND

FIG. 1 depicts a conventional disk drive 10 used in magnetic recording technology applications. The conventional disk drive 10 includes a read apparatus 20 and a slider or substrate 30 on which the read apparatus 20 is formed. The conventional read apparatus 20 includes a read sensor 22 and additional electronics 24. The read sensor 22 may be a magnetoresistive sensor, such as a magnetic tunneling junction or spin valve. Thus, the read sensor 22 is represented as a resistor. The slider 30 has a bias contact 32. The bias contact 32 may be connected to a voltage source that provides a slider body bias voltage, which is typically a DC voltage. The slider body bias voltage may be used to control the voltage difference between the read apparatus 20 and the media (not shown in FIG. 1). The additional electronics 24 may be connected between the sensor 22 and a ground pad 26. The additional electronics may be used to account for variations in the read sensor 22 and to assist in the event of electrostatic discharge.

Although the conventional read apparatus 10 functions, improvements may be desired. For example, applying a DC slider body bias voltage is desirable for some reasons, this bias voltage may adversely affect performance of the read sensor 22. Similarly, the sensor 22 may be desired to be isolated from high frequency signals, such as cell phone signals. Accordingly, what is needed is a system and method for improving the performance of a magnetic recording read apparatus.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 1:
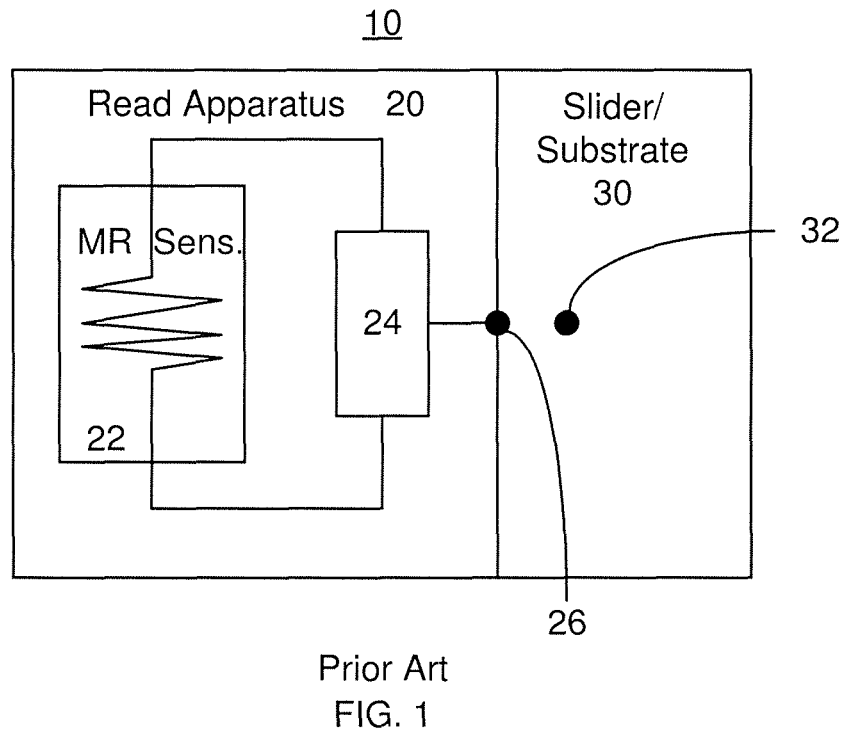
FIG. 1 is a diagram depicting a conventional magnetic recording read apparatus.

In order to improve the performance of the conventional read apparatus 20 depicted in FIG. 1, a resistor-capacitor (RC) circuit might be used. Such an RC circuit includes a resistor electrically connected in parallel to a capacitor. These elements are connected in parallel between the ground pad 26 and the bias contact pad 32 depicted in FIG. 1. These electrical connections may be made using conventional electrical lines. For example, the connection may be made via conductive metal straps between each of the plates of the capacitor and opposite ends of the resistor. However, it has been determined that such an RC circuit does not function as desired.

Figure 2:
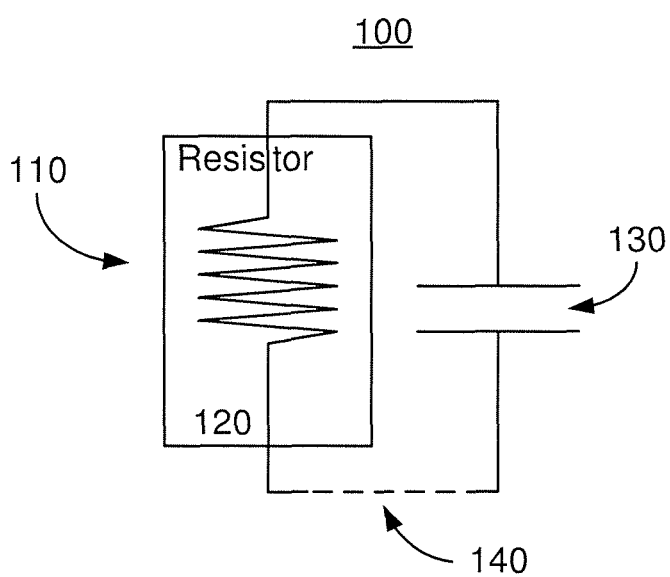
FIG. 2 depicts an exemplary embodiment of an isolation circuit usable in a magnetic read apparatus.

FIG. 2 depicts an exemplary embodiment of a portion of a magnetic read apparatus 100. The read apparatus 100 may be part of a read head or may be part of a merged head that also includes a write apparatus. Thus, the read apparatus 100 may be part of a disk drive. However, the read apparatus 100 may be used in another data storage device. The read apparatus 100 also includes a read sensor (not shown in FIG. 2) and may include leads, shields, and/or other structures that are not shown for clarity.

The read apparatus 100 includes an isolation circuit 110 that resides on a substrate and includes a portion of a substrate 140. The substrate connection 140 is shown only as a dashed line in FIG. 2. The dashed line depicting the connection through the substrate connection 140 is meant to indicate the electrical connection between elements 120 and 130, not to indicate a particular current path. The path of current through the substrate connection 140 may extend significant distances from the physical circuit elements depicted in FIG. 2. The substrate containing the substrate connection 140 may be an AlTiC substrate, for example for a slider used in a disk drive, or another substrate. Such a substrate typically has a resistivity on the order of 40 Ω-μm. Note that most metallic conductors have resistivities of less than one Ohm-micron.

The isolation circuit 110 includes a bias resistor 120 and a capacitor 130 that are connected in parallel. On one side, the bias resistor 120 and capacitor 130 are connected via traditional electrical connections. For example, the bias resistor 120 and capacitor 130 may be connected via conductive lines or metallic straps. On the other side, as shown in FIG. 2, the bias resistor 120 and capacitor 130 are coupled in parallel through the substrate connection 140.

The values of the bias resistor 120 and the capacitor 130 are selected to provide the desired frequency characteristics for the impedance of the isolation circuit 110. In general, the isolation circuit 110 is desired to have a high DC impedance and a low high frequency impedance. At low frequencies, the isolation circuit 110 has a high impedance due to the presence of the capacitor 130. At DC, the capacitor 130 is an open circuit. Thus, a read sensor may be isolated from a DC body bias voltage. At high frequencies, the capacitor 130 may have a near zero impedance. In some embodiments, the resistance of the bias resistor 120 and capacitance of the capacitor 130 are selected such that the isolation circuit 110 has an impedance of not more than ten Ohms at a frequency of at least nine hundred MHz and not more than five GHz. In some such embodiments, the resistance is less—on the order of two to three Ohms—in this frequency range. In other embodiments, the resistance of the bias resistor 120 and capacitance of the capacitor 130 may be selected to filter signals in other frequency ranges. In addition, other considerations, such as bias voltages, may be taken into consideration when selecting the bias resistor 120 and capacitor 130.

Although not explicitly depicted in FIG. 2, the bias resistor 120 and capacitor 130 are generally connected to a ground pad (not shown) and a bias connection pad (not shown) that are formed on the substrate. The bias resistor 120 and capacitor are generally connected in parallel to these pads. For example, the capacitor 130 includes two metallic plates separated by an insulating layer. One plate may be connected to the ground pad while the other plate is connected to the bias connection pad. Because of the connection through the substrate, in some embodiments, the capacitor 130 may be electrically coupled to the bias connection pad through the substrate. In other embodiments, the capacitor 130 may be electrically coupled to the ground pad through the substrate. The read sensor (not shown in FIG. 2) for the read apparatus 100 is generally electrically connected to the ground pad. The isolation circuit may thus be used to electrically isolate the read sensor (not shown in FIG. 2) from the DC bias provided via the bias connection pad.

The read apparatus 100 utilizing the isolation circuit 110 may have improved performance. The isolation circuit 110 has the desired impedance characteristics. At low frequencies, the isolation circuit 110 has a high impedance due to the capacitor 130, as desired. The capacitor 130 is an open circuit for DC voltages, allowing circuit elements such as a read sensor to be isolated from a substrate bias voltage. At high frequencies, such as RF frequencies, the impedance of the isolation circuit 110 is desired to be low, for example under ten Ohms. This may aid in isolating the circuit elements such as a read sensor (not shown in FIG. 2) from RF signals such as cell phone signals. The low impedance is obtained not only by the connections of the bias resistor 120 and capacitor 130, but also by the connection through the substrate connection 140. Theoretically, the conductive lines connecting the bias resistor 120 and the capacitor 130 have zero resistance. However, it has been determined that in reality, there is a contribution of the conductive lines to the impedance of the isolation circuit 110. Even when wide metallic straps are used to connect the bias resistor 120 and the capacitor 130, the resistance of the metallic straps may cause the impedance of the isolation circuit 110 to be higher than desired at high frequencies. For example, the low resistivity conductive straps and lines may result in the impedance of the isolation circuit 110 being on the order of one hundred ohms in the one through five megahertz range. Consequently, electrical connection is made through the substrate connection 140 in the isolation circuit 110. This would initially appear to be unhelpful because the resistivity of the substrate is generally significantly higher than the conductive lines/straps used in the isolation circuit 110. However, the substrate connection 140 has an unconstrained current path that may be very wide and/or deep. This unconstrained current path more than compensates for the high resistivity. The high frequency behavior of the isolation circuit 110 may not be limited by the substrate connection 140 or metal lines in the frequency range of interest (e.g. in the RF range). As a result, the impedance of the isolation circuit 110 may be further reduced at high frequencies. For example, the impedance of the isolation circuit 110 may be not more than ten Ohms in a frequency range of nine hundred MHz through five GHz. Thus, the desired circuit element(s) may be isolated from cell phone and other signals. Because the desired circuit element(s) may be isolated from a DC substrate voltage and from high frequency signals, performance of the read apparatus 100 may be improved.

Figure 3:
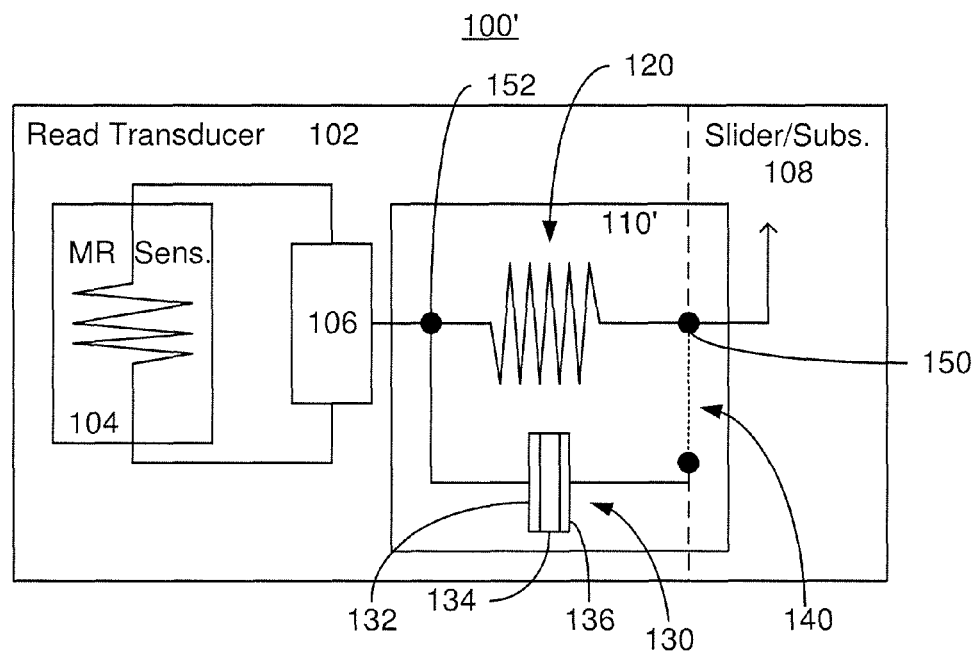
FIG. 3 depicts an exemplary embodiment of a magnetic read apparatus incorporating an exemplary embodiment of an isolation circuit.

FIG. 3 depicts an exemplary embodiment of a portion of a magnetic read apparatus 100'. The read apparatus 100' may be part of a read head or may be part of a merged head that also includes a write apparatus. Thus, the read apparatus 100' may be part of a disk drive. However, the read apparatus 100' may be used in another data storage device. The read apparatus 100' also includes a read sensor (not shown in FIG. 3) and may include leads, shields, and/or other structures that are not shown for clarity.

The read apparatus 100' is analogous to the read apparatus 100. Thus, analogous components have similar labels. The read apparatus 100' resides on a slider or substrate 108 of which the substrate connection 140 is a part. The read apparatus 100' includes an isolation circuit 110' having a bias resistor 120, a capacitor 130 and a substrate connection 140 that are analogous to the bias resistor 120, capacitor 130 and substrate connection 140 depicted in FIG. 2.

The read apparatus 100' explicitly includes a magnetoresistive sensor 104 and other electronics 106. The other electronics 106 may serve to mitigate variations due to the stripe height variations of the read sensor 104 and to provide shunting resistors accounting for electrostatic discharge. Also shown are slider bias connection 150 and ground pad 152. As can be seen in FIG. 3, both the isolation circuit 110' and the magnetoresistive sensor are coupled to the ground pad 152.

The substrate 108 is generally at least partially insulating. For example, the substrate 108 may be an AlTiC substrate. Thus, the read apparatus 100' may be on a slider 108 used in a disk drive, or another substrate. Although denoted by a different number, the substrate connection 140 is a portion of the substrate 108. More specifically, the substrate connection 140 is a portion of the substrate 108 through which current flows between the bias resistor 120 and the capacitor 130.

The isolation circuit 110' includes the bias resistor 120 and the capacitor 130 that are connected in parallel. On one side, the bias resistor 120 and capacitor 130 are connected via traditional electrical connections. For example, the bias resistor 120 and capacitor 130 may be connected via conductive lines or straps. The connection of the isolation circuit 110' to the electronics 106 and read sensor 104 may also be through metallic lines or straps. On the other side, the bias resistor 120 and capacitor 130 are coupled in parallel through the substrate connection 140. In the embodiment shown, the capacitor 130 is connected to the bias connection pad 150 through the substrate connection 140.

The capacitor 130 is explicitly shown as including conductive plates 132 and 136 that are separated by an insulating layer 134. The substrate connection 140 is shown as a dashed line terminating in the slider bias connection 150 and another terminal near the capacitor 130. The dashed line for the connection through the substrate connection 140 is not meant to indicate a particular current path. The path of current through the substrate connection 140 may be unconstrained, extending significant distances from the dashed line both in the plane of the page and perpendicular to the plane of the page shown in FIG. 3. Stated differently, the current path through the substrate 108 via the substrate connection 140 may be quite large. As discussed above, the values of the bias resistor 120 and the capacitor 130 are selected to provide the desired frequency characteristics for the impedance of the isolation circuit 110'. For example, the bias resistor 120 and capacitor 130 may be chosen to isolate DC signals and filter signals in the desired frequency range. Other considerations may also be used in selecting the bias resistor 120 and capacitor 130.

The read apparatus 100' utilizing the isolation circuit 110' may have improved performance. The isolation circuit 110' has the desired impedance characteristics. At low frequencies, the isolation circuit 110' has a high impedance due to the capacitor 130. At DC, the isolation circuit 110' may be an open circuit because of the capacitor 130. At high frequencies, such as RF frequencies, the impedance of the isolation circuit 110' is low, for example under ten Ohms. This may aid in isolating the read sensor 104 to RF signals such as cell phone signals. The low impedance is obtained not only by the connections of the bias resistor 120 and capacitor 130, but also by the electrical connection through the substrate connection 140. As discussed above, connection is made through the substrate 140 is believed to have an unconstrained current path that more than compensates for the high resistivity of the substrate 108. As a result, the impedance of the isolation circuit 110' may be further reduced at high frequencies. For example, the impedance of the isolation circuit 110' may be not more than ten Ohms in a frequency range of nine hundred MHz through five GHz. Thus, the read sensor 104 and/or other components may be isolated from cell phone and other signals at the high frequency end and from the slider body bias voltage at DC. Performance of the read apparatus 100' may thus be improved.

Figure 4:
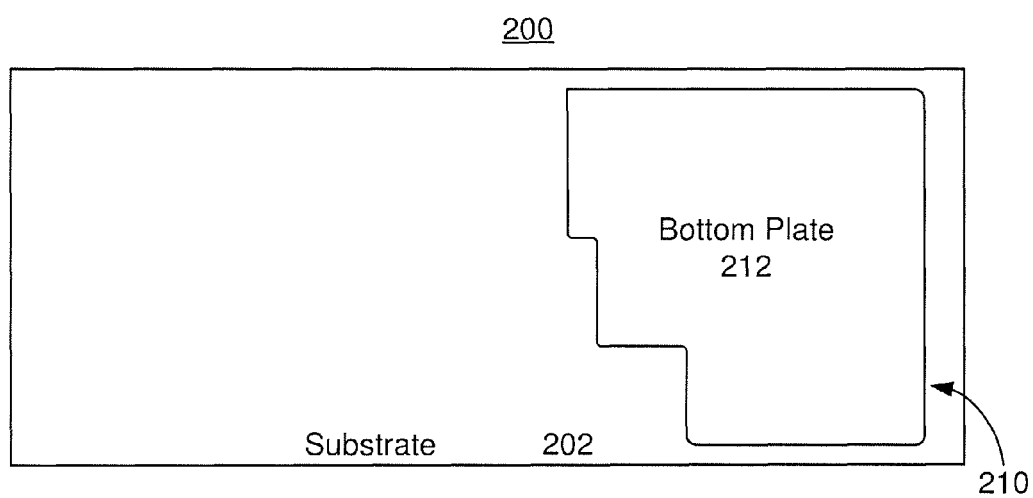
FIGS. 4-6 depict an exemplary embodiment of a magnetic read apparatus incorporating an exemplary embodiment of an isolation circuit during fabrication.
Figure 5:
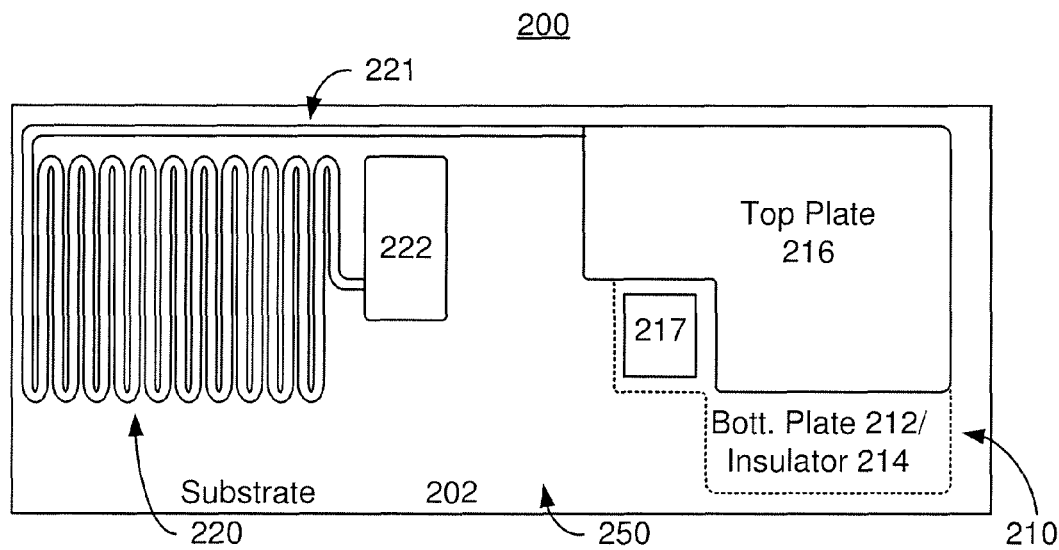
Figure 6:
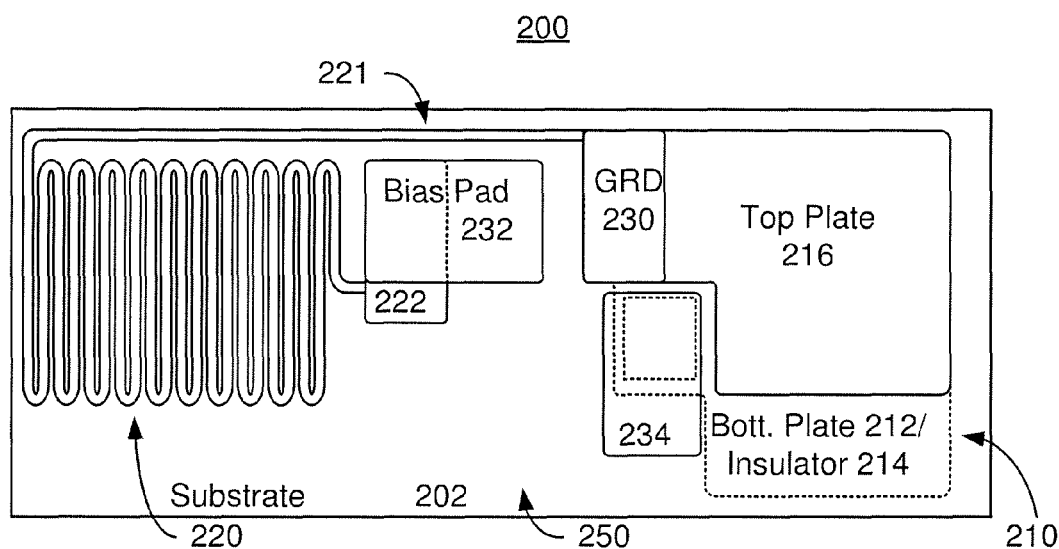

FIGS. 4-6 depict plan views of a portion of a magnetic read apparatus 200. In particular, different layers of the magnetic read apparatus 200 are shown in FIGS. 4-6. For clarity, FIGS. 4-6 are not to scale and only a portion of the components of the magnetic read apparatus 200 are depicted. The magnetic read apparatus 200 is analogous to the magnetic read apparatuses 100 and 100'.

FIG. 4 depicts lower layer(s) of the magnetic read apparatus 200. The bottom plate 212 of a capacitor 210 has been formed on the substrate 202. The bottom plate 212 may be a metal plate. The substrate 202 may be AlTiC.

FIG. 5 depicts intermediate layer(s) of the magnetic read apparatus 200 with additional structures 214, 216, 217, 220 and 222 shown. The bottom plate 212 has been covered by insulator 214. In some embodiments, the insulator 214 may cover the surface of the substrate 202. In other embodiments, the insulator 214 only covers the bottom plate 212 and the region immediately around the bottom plate 212. Also shown is the top plate 216 that covers a portion of the bottom plate 212. The capacitor 210 corresponds to the capacitor 130 depicted in FIGS. 2 and 3.

The bias resistor 220 is also shown. The bias resistor 220 is analogous to the bias resistor 120 depicted in FIGS. 2 and 3. The bias resistor 220 may simply be a patterned conductive line having sufficient length and small enough cross sectional area to have the desired resistance. As can be seen in FIG. 5, the bias resistor 220 is connected to the top plate 216 via metal line 221. Also shown are conductive pads 217 and 222. The connection through the substrate 202 is to be made between the bottom plate 212 and the pad 222. This connection is analogous to the connection 140 depicted in FIGS. 2 and 3. The pad 222 is connected with the end of the bias resistor 220. The isolation circuit 250 includes the capacitor 210, the bias resistor 220, the metal line 221 and the connection through the substrate 202 that connect the elements 210 and 220 in parallel. The isolation circuit 250 is analogous to the isolations circuits 110 and/or 110'.

FIG. 6 depicts upper layer(s) of the magnetic read apparatus 200 with additional structures 230, 232 and 234 shown. The bias connection pad 232 is used to couple the DC slider/substrate bias to the read apparatus 200. The ground pad 230 is the connection to ground. Pad 234 has also been provided. The read sensor (not shown) is coupled at least to the ground pad 230. This connection may be made through additional electronics (not shown).

The read apparatus 200 may have improved performance. The isolation circuit 250 has the desired impedance characteristics. At low frequencies, the isolation circuit 250 has a high impedance due to the capacitor 230. At high frequencies, such as RF frequencies, the impedance of the isolation circuit 250 is low, for example under ten Ohms. The low impedance at high frequencies is achieved at least in part by the electrical connection through the substrate 202. As discussed above, connection is made through the substrate 202 is believed to have an unconstrained current path. As a result, the impedance of the isolation circuit 210 may be reduced at high frequencies. This reduction in impedance may be enhanced by using a very high conductivity metal, such as TiCu on the top plate 216 of the capacitor 210. Thus, the impedance of the isolation circuit 110 may be not more than ten Ohms in a frequency range of nine hundred MHz through five GHz. Performance of the read apparatus 200 may thus be improved.

Figure 7:
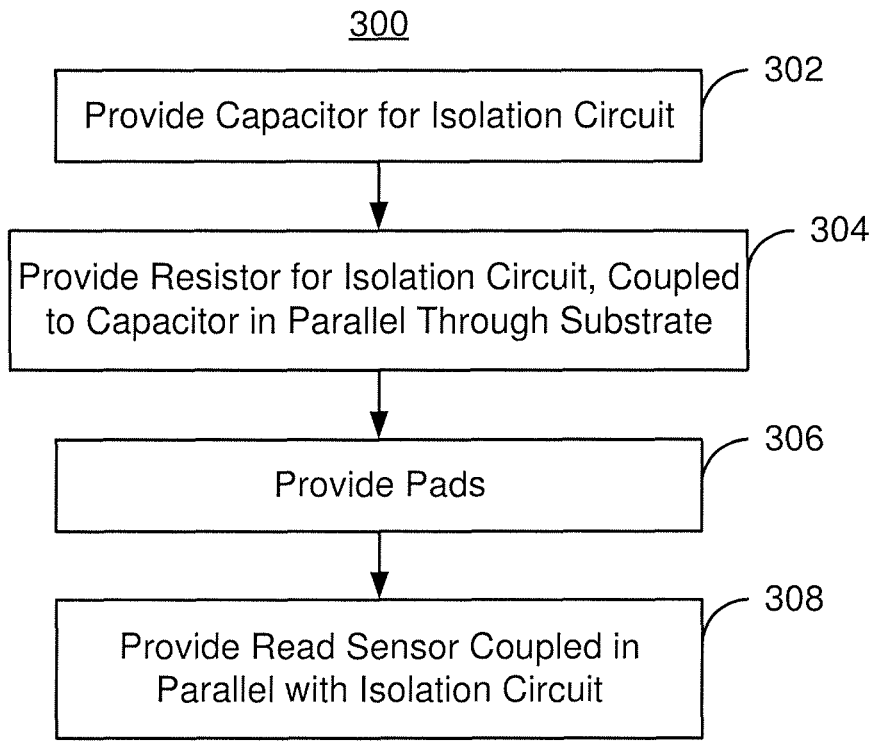
FIG. 7 is a flow chart depicting an exemplary embodiment of a method for fabricating a magnetic read apparatus.

FIG. 7 is a flow chart depicting an exemplary embodiment of a method 300 for providing a read apparatus including an isolation circuit. For simplicity, some steps may be omitted, interleaved, combined, have multiple substeps and/or performed in another order unless otherwise specified. The method 300 is described in the context of the read apparatuses 100, 100' and 200 and, therefore, disk drives. However, the method 300 may be used in fabricating other read apparatuses having different components. However, the method may be used in fabricating other data storage devices. The method 300 may be used to fabricate multiple read apparatuses at substantially the same time. The method 300 is also described in the context of particular layers. A particular layer may include multiple materials and/or multiple sub-layers. The method 300 also may start after formation of other portions of the magnetic recording apparatus.

The capacitor 130/210 for the isolation circuit 110/110'/250 is provided, via step 302. Step 302 may include depositing and patterning the metal layer for the bottom plate, providing the insulating layer and providing the top plate. The bias resistor 120/220 for the isolation circuit 110/110'/250 is also provided, via step 304. Step 304 may include depositing and patterning the conductive layer for the bias resistor 120/220. The pads are also provided, via step 306. Step 306 may include providing the ground pad 152/230 and the substrate bias connection pad 150/232. In addition, pads 217, 222 and 234 may also be formed in step 306. The read sensor 104 may also be provided, via step 308.

Using the method 300, the isolation circuit 110/110'/250 may be fabricated. As a result, the benefits of the isolation circuits 110/110'/250 may be achieved.

Figure 8:
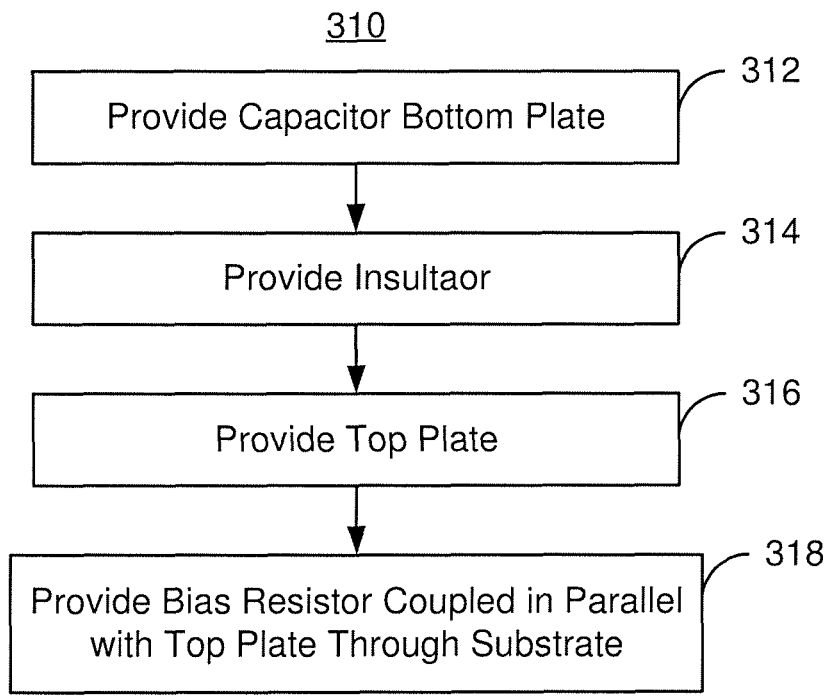
FIG. 8 is a flow chart depicting an exemplary embodiment of a method for fabricating an isolation circuit for a magnetic read apparatus.

FIG. 8 is a flow chart depicting an exemplary embodiment of a method 310 for providing an isolation circuit for a read apparatus. For simplicity, some steps may be omitted, interleaved, combined, have multiple substeps and/or performed in another order unless otherwise specified. The method 300 is described in the context of the isolation circuits 110, 110' and 250 and, therefore, disk drives. However, the method 310 may be used in fabricating other read apparatuses having different components. However, the method may be used in fabricating other data storage devices. The method 310 may be used to fabricate multiple isolation circuits at substantially the same time. The method 310 is also described in the context of particular layers. A particular layer may include multiple materials and/or multiple sub-layers. The method 310 also may start after formation of other portions of the magnetic recording apparatus.

The bottom plate 132/212 of the capacitor 130/210 for the isolation circuit 110/110'/250 is provided, via step 312. Step 312 may include depositing and patterning the metal layer for the bottom plate 132/212. The insulating layer 134/214 is provided, via step 314. The top plate 134/214 is provided, via step 316. The bias resistor 120/220 for the isolation circuit 110/110'/250 is also provided and coupled to the capacitor 130/210 through the bottom plate 132/212, via step 318.

Using the method 310, the isolation circuit 110/110'/250 may be fabricated. As a result, the benefits of the isolation circuits 110/110'/250 may be achieved.

What is claimed is:

1. A magnetic read apparatus comprising:
a substrate; and
an isolation circuit including a bias resistor and a capacitor residing on the substrate, the bias resistor including a first end and a second end, the capacitor including a first plate, a second plate and an insulator between the first plate and the second plate, the first end being connected to the first plate by at least one conductive line, the second end being connected to the second plate through the substrate and free of another conductive line connecting the second end to the second plate such that the bias resistor and the capacitor are connected in parallel through the substrate.

2. The magnetic read apparatus of claim 1 wherein the substrate includes a ground pad and a bias connection pad, the bias resistor and the capacitor being connected in parallel to the ground pad and the bias connection pad.

3. The magnetic read apparatus of claim 2 wherein the second plate is electrically connected to a pad through the substrate, the pad being selected from the ground pad and the bias connection pad.

4. The magnetic read apparatus of claim 3 wherein the capacitor is coupled to the bias connection pad through the substrate.

5. The magnetic read apparatus of claim 3 wherein the capacitor is coupled to the ground pad through the substrate.

6. The magnetic read apparatus of claim 1 wherein the substrate is a slider.

7. The magnetic read apparatus of claim 2 further comprising:
a read sensor connected to the ground pad and the isolation circuit such that the read sensor is isolated from the bias connection pad.

8. The magnetic read apparatus of claim 1 wherein the isolation circuit has an impedance of not more than ten Ohms at a frequency of at least one hundred MHz and not more than ten GHz.

9. The magnetic read apparatus of claim 1 wherein the isolation circuit has an impedance of not more than ten Ohms at a frequency of at least nine hundred MHz and not more than five GHz.

10. The magnetic read apparatus of claim 1 wherein the second end is connected to the second plate only through the substrate such that the bias resistor and the capacitor are connected in parallel through the substrate.

11. A magnetic read apparatus comprising:
a slider including a ground pad and a bias connection pad;
an isolation circuit including a bias resistor and a capacitor residing on the slider, the bias resistor including a first end and a second end, the second end of the bias resistor being connected to the ground pad, the first end of bias resistor being connected to the bias connection pad, the capacitor having a first plate, a second plate and an insulating layer between the first plate and the second plate, the first plate being electrically connected to the bias connection pad through the slider and free of another conductive line connecting the first plate to the bias connection pad, the second plate being directly connected to the ground pad by at least one conductive line such that the bias resistor and the capacitor are connected in parallel through the slider; and
a read sensor connected to the ground pad in parallel with the isolation circuit;
wherein the isolation circuit had an impedance of not more than ten Ohms at a frequency of at least one hundred MHz and not more than ten GHz.

12. A method for providing a magnetic read apparatus comprising:
providing an isolation circuit including a bias resistor and a capacitor residing on a substrate, an isolation circuit including a bias resistor and a capacitor residing on the substrate, the bias resistor including a first end and a second end, the capacitor including a first plate, a second plate and an insulator between the first plate and the second plate, the first end being connected to the first plate by at least one conductive line, the second end being connected to the second plate through the substrate and free of another conductive line connecting the second end to the second plate such that the bias resistor and the capacitor are connected in parallel through the substrate.

13. The method of claim 12 further comprising:
forming a ground pad on the substrate; and
providing a bias connection pad on the substrate, the bias resistor and the capacitor being connected in parallel to the ground pad and the bias connection pad.

14. The method of claim 13 wherein the pad is selected from the ground pad and the bias connection pad.

15. The method of claim 14 wherein the capacitor is coupled to the bias connection pad through the substrate.

16. The method of claim 12 wherein the substrate is a slider.

17. The method of claim 13 further comprising:
providing a read sensor connected to the ground pad and the isolation circuit such that the read sensor is isolated from the bias connection pad.

18. The method of claim 12 wherein the isolation circuit has an impedance of not more than ten Ohms at a frequency of at least one hundred MHz and not more than ten GHz.

* * * * *